United States Patent

[11] 3,612,578

[72] Inventor Luigi Bagnulo
Via Volta 18, Milan, Italy
[21] Appl. No. 886,105
[22] Filed Dec. 18, 1969
[45] Patented Oct. 12, 1971
[32] Priority Dec. 21, 1968
[33] Italy
[31] 25488/68

[54] PREFABRICATED ELECTRICALLY INSULATING PIPE JOINT
10 Claims, 3 Drawing Figs.
[52] U.S. Cl. .................................................. 285/50, 285/55, 285/374
[51] Int. Cl. .................................................. F16l 55/00
[50] Field of Search .......................................... 285/50, 52, 53, 54, 55, 374

[56] References Cited
UNITED STATES PATENTS
3,503,633  3/1970  Braun et al. .................. 285/54
FOREIGN PATENTS
245,540   7/1963   Australia ....................... 285/50
676,449   12/1963  Canada ......................... 285/52
1,237,860  6/1960  France ......................... 285/52
446,831   3/1968   Switzerland ................... 285/50

*Primary Examiner*—Dave W. Arola
*Attorney*—Michael S. Striker

ABSTRACT: A first pipe of metallic material has a cup-shaped socket at one end, and a second pipe of metallic material has a flange at one end which is received with clearance in the socket of the first pipe. The bottom wall of the socket is juxtaposed with the axial end face of the flange. The latter is provided in this axial end face with an annular groove concentric with the pipe and having an inner diameter equal to the inner diameter of the pipe and an outer diameter smaller than the outer diameter of the flange. An annular member of rigid electrically insulating material is fixedly received in this groove, having an inner diameter at least substantially equal to the inner diameter of the first groove. A second annular groove is provided in the bottom face of the socket and has an outer diameter at least equal to the outer diameter of the flange and an inner diameter larger than the inner diameter of the first groove but smaller than the outer diameter of the same. A second annular member of elastically yieldable electrically insulating material is received in the second groove and has an inner circumferential margin in fluidetightly sealing engagement with the corresponding outer circumferential margin of the first annular member. Discrete first and second coatings of electrically insulating material are respectively provided on the inner surfaces of the respective tubular members and each extended to the juncture between the tubular members. Means is provided filling the clearance and connecting all of the members mechanically against movement and in electrically insulating relationship.

PATENTED OCT 12 1971 3,612,578

INVENTOR
LUIGI BAGNULO
BY
Nigel S. Stickler
ATTORNEY

PREFABRICATED ELECTRICALLY INSULATING PIPE JOINT

BACKGROUND OF THE INVENTION

The present invention relates generally to pipe joints, and more particularly to electrically insulating pipe joints. Still more specifically the present invention relates to electrically insulating pipe joints which interrupt continuity between connected metal pipes or conduits to prevent the flow of electric current between them and the ensuing corrosion phenomena.

Pipe joints of this type are already known. In particular, it is known to provide a first tubular member with a socket, a second tubular member with an end flange received in the socket, a sealing ring of a flexible and electrically insulating material located between the bottom wall of the socket and the flange, and a compression resistant spacer ring which is inserted between the flange and the open side of the socket. A locking ring is screwed or welded to the socket located at the open side extending into the socket so as to prevent the flange and sealing rings from being withdrawn through the open side of the socket. An electrically insulating material is introduced in liquid state into the socket to fill the interstices between the various components of the joint for purposes of electrical insulation as well as to make the joint monolithic, the electrically insulating material being hardenable. A spacer ring made of filled resin is inserted between the juxtaposed surfaces of the socket and the flange in those regions which are not occupied by the sealing ring of flexible and electrically insulating material which is also accommodated between these surfaces. A lining of electrically insulating paint or other material is applied on the inner circumferential surfaces of the two thus-connected tubular members over the junction line between them and extending for a certain distance axially away from the junction line.

This lining or coating is intended to avoid the formation of electric arcs between the inner surfaces of the connected tubular members, particularly in instances where the connected tubular members convey water or other liquids which are electrically conductive.

While those known joints in themselves constitute an improvement over the state of the art existing before they became known, they are unfortunately still possessed of certain disadvantages. Particularly if such a joint is utilized in connecting pipes or conduits of large diameter, and if the joint must withstand high pressures, it has been observed that the attempts to make the joint completely rigid notwithstanding, the contact surfaces between the connected tubular members —that is within the pipe joint— show a tendency to become detached from each other under the frequently very high mechanical stresses, particularly tensile and bending stresses, with the result that the electrically insulating coating or lining will crack in the region of the juncture of the connected tubular members and will permit some of the liquid conveyed through the tubular members to ooze into the joint and into contact with the surfaces of the electrically conductive tubular members, with the result that a rapid and significant decrease in the ohmic resistance of the joint takes place which increases over a period of time. Evidently, this negates the purposes of the joint.

Attempts to further rigidify the joint by embedding the various constituent portions thereof in a polymerizable hardenable synthetic resin in the hope that this would prevent the joint from undergoing any deformations significant enough to permit relative movement of its constituent components and thereby cracking of the insulating lining, have failed. Repeated tests on joints so constructed have demonstrated that even resin having an extremely high rigidity is unable to prevent the formation of cracks —which may only be hairline cracks— and the consequent intrusion of some of the liquid from the interior of the tubular members into the joint. It will be understood that it is sufficient to destroy the purposes of the joint if even only a few drops of the liquid are capable of so intruding.

Furthermore, with the thus reinforced joints it was necessary to press the flange on one tubular member into the socket on the other tubular member with significant force, in order to place the sealing member disposed between the juxtaposed surfaces of the socket and the flange into compression. It was found, however, that over a period of time under these pressures the sealing member tends to expand in radial direction and to "creep" through the gap at the juncture between the connected tubular members, penetrating the mechanically not very resistant electrically insulating lining and projecting into the interior of the members. This, of course, exposes the sealing member to direct contact with the liquid carried in the tubular members and rapid deterioration usually follows. Finally, it was found to be unavoidable that air bubbles form in the joint, particularly in the resin, with the result that arcs may be formed through such air bubbles between the connected tubular members.

Thus, these known joints are not able to meet all the requirements which are made of such joints, particularly in specifications established by users and official agencies. According to these specifications it is essential that the joints maintain unchanged over prolonged periods of time, both with respect to their mechanical and electrical characteristics, under every possible stress to which they may be subjected in operation of the tubular members. This is particularly true where the pipes or tubular members carry incompressible fluids. Test specifications in force for joints of the type in question frequently specify that the joints are to be subjected to approximately one hundred hydraulic pressure test cycles ranging between 0 and 1.5 times the working pressure. Unsupported caps are welded to the opposite open ends of the joints so that during the tests the joints are subjected directly to the highest stresses. In order to meet the test requirements the joints after the tests have been carried out must be found not to have allowed any hydraulic leakage, not to alter the normal flow of fluids through the tubular members, not to permit the formation of electrical arcs along the inner surfaces of the connected tubular member when carrying gas, not to permit the formation of harmful anodic zones where conductive liquids are conveyed, to provide safe and durable electrical insulation, and to offer a minimum perforation voltage unaltered over the course of time of a clearly stated value, generally near 2.5 kv.

SUMMARY OF THE INVENTION

It is, accordingly, an object of the present invention to provide an improved joint of the type here under discussion.

More particularly it is an object of the present invention to provide an electrically insulating joint which is not possessed of the advantages discussed above with respect to the prior art.

A further object of the present invention is to provide such a pipe joint which is relatively simple in its construction but which is exceedingly reliable, and which remains reliable over long periods of time.

In pursuance of the above objects, and others which will become apparent hereafter, one feature of the invention resides in an electrically insulating pipe joint which comprises, briefly stated, a first tubular member of metallic material having at one end thereof a cup-shaped socket member provided with an open side and a transversely extending bottom face opposite the open side. A second tubular member of metallic material has at one end a transverse flange member of predetermined outer diameter received with clearance in the socket member and having an axial face juxtaposed with the bottom face and an axially directed surface facing the open side of the socket member. A first annular groove is provided in one of these faces concentric with the respective tubular member and having an inner diameter equal to the inner diameter of the same, and an outer diameter smaller than the predetermined outer diameter of the flange member. A circumferentially complete first annular member of rigid electrically insulating material is fixedly received in and has an inner diameter at least substantially equal to the inner diameter of the first groove.

A second annular groove is provided in the other of the faces concentric with the respective tubular member and has an outer diameter at least equal to the predetermined diameter of the flange member, and inner diameter which is larger than the inner diameter of the first groove but smaller than the outer diameter of the same.

A circumferentially complete second annular member of elastically yieldable electrically insulating material is received in the second groove at least substantially filling the same and having an inner circumferential margin in fluidtight sealing engagement with a corresponding outer circumferential margin of the first annular member.

Discrete first and second coatings of electrically insulating material are respectively provided on the inner surfaces of the respective tubular members and each extend to the juncture between the tubular members. Finally, means are provided filling the clearance and connecting all of the members mechanically against movement and in electrically insulating relationship.

Thus, in the construction according to the present invention no attempt is made to have the coating on the inner surface of the tubular member bridge the juncture between them at the interior of the insulating pipe joint. Instead, it has been accepted that the formation of a crack along and in the region of this juncture is probably unavoidable, and therefore the coating is provided in two portions which are discrete, so that a discontinuity exists between the coating portions on the respective tubular members at the inside or interior of the pipe joint. However, the sealing elements associated with the pipe joint are so arranged as to strictly limit the extent to which liquid capable of entering at the juncture can penetrate, to thereby guarantee that liquid cannot penetrate into the joint to an extent where it could permit the formation of electrical arcs and alter in any way the intended characteristics of the joint.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
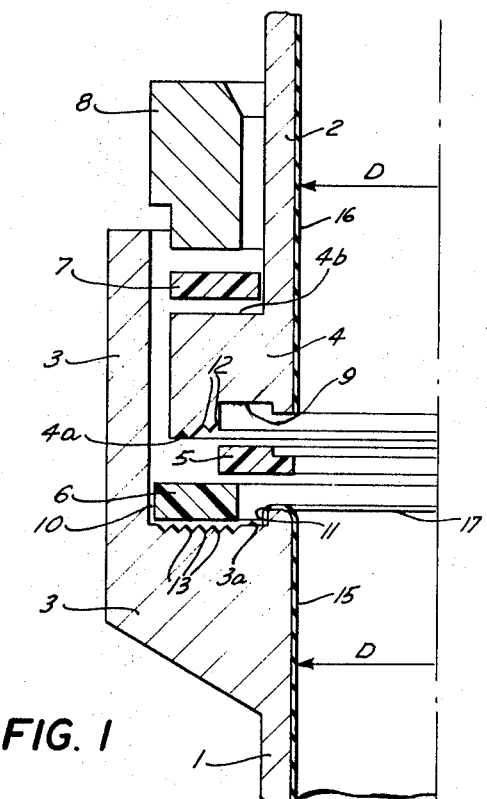
FIG. 1 is a fragmentary sectional exploded view through an embodiment of a pipe joint according to the present invention.
Figure 2:
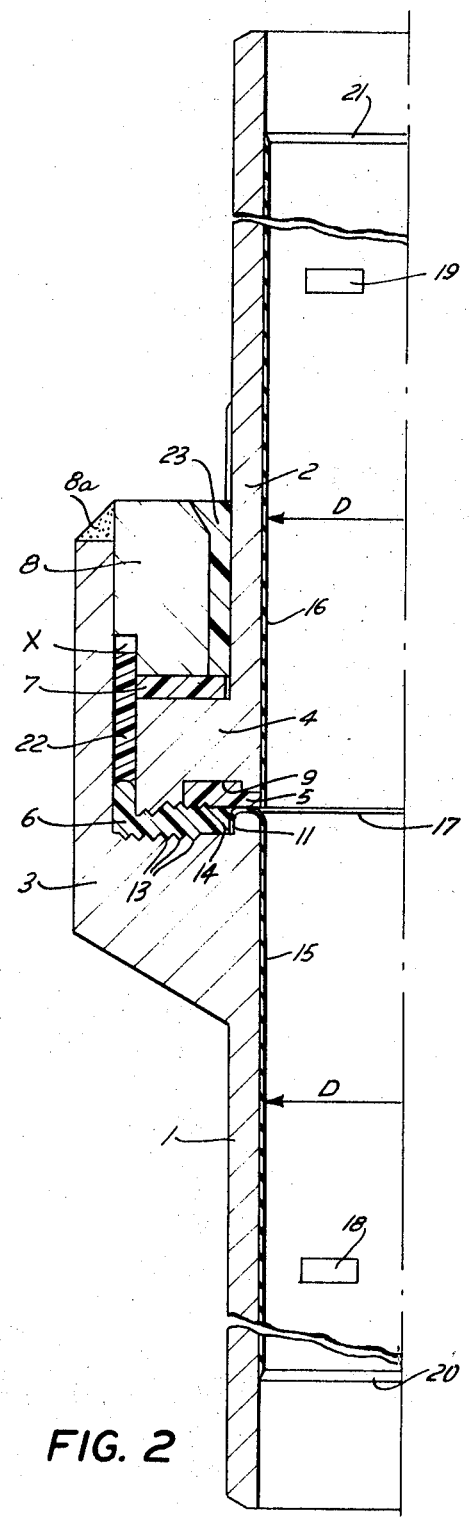
FIG. 2 is a view similar to FIG. 1 but illustrating the pipe joint in assembled condition.

Coming now to a more detailed discussion of the drawing, an exemplary embodiment of the joint according to the present invention will be seen to be illustrated in FIGS. 1 and 2. Two tubular members are provided and identified with reference numerals 1 and 2, respectively. Tubular member 1 is provided at one end with a cup-shaped open-ended socket 3, and tubular member 2 is provided at one end with a transversely extending flange member 4 which is received with clearance within the confines of the socket 3. A spacer ring of rigid electrically insulating material 5, whose inner diameter corresponds to that of the tubular members 1, 2, and whose outer diameter is smaller than the outer diameter of the flange 4, is received in a recess 9 provided for this purpose and having an inner diameter at least substantially corresponding to the inner diameter of the tubular members 1, 2 and an outer diameter corresponding to the outer diameter of the spacer ring 5. This coaction between recess 9 and the spacer ring 5 is important, it being understood that the ring 5 must be firmly anchored in recess 9. The thickness of ring 5 is chosen in accordance with the desired perforation voltage and may therefore vary in dependence upon this factor.

Whereas the annular recess 9, concentric with the tubular member 2, was provided in the axially directed face 4a of the flanges 4, the bottom face 3a of the cup-shaped socket 3 is similarly provided with an annular recess 10. This, however, has an inner diameter which is intermediate the inner and outer diameters of the recess 9. The outer diameter of the recess 10 is at least equal to and, if desired, larger than the outer diameter of the flange 4. Accommodated in the recess 10 is an annular member 6 of electrically insulating resiliently yieldable material, such as an elastomeric material which is thus prevented from "creeping" through the gap at the juncture between members 1 and 2 as is known from the prior art. To further prevent relative movement of the members 5, 6 and 3, 4, the bottom face 3a is provided with projections, ridges, circumferentially extending or otherwise extending grooves or the like, identified with reference numeral 13, and the surface 4a of the flange 4 is similarly provided with such projections or analogous means 12.

An annular spacing element 7 of electrically insulating material is provided, together with a blocking ring member 8. These latter two members are already known from the prior art. It is emphasized that the presence of ring 7, and its construction from highly compression resistant material, is essential for assuring the necessary distance between the metallic components and the electrically insulating components.

In assembling the joint according to the present invention, illustrated in FIG. 1 in exploded view and in FIG. 2 in assembled condition, the member 5 is inserted into the groove 9, for instance by being forced into the same and adhesively bonded therein. The member 6 is introduced into the cup-shaped socket member 3 into the position shown in FIG. 1. Thereupon, the flange 4 is inserted and subjected to an axial force acting in direction towards the bottom wall face 3a of the member 1. This results in axial compression of the sealing member 6, a portion of which is forced into the radially outer clearance between the outer circumferential edge face of the flange 4 and the inner circumferential surface of the recess in the cup-shaped socket 3, as illustrated in FIG. 2. An inner circumferential marginal portion of the element 6 is forced into fluidtightly sealing engagement with a corresponding outer circumferential marginal portion of the sealing member 5 as shown in FIG. 2 so that they overlap one another and provide a reliable seal.

According to the present invention it is advantageous to accommodate in the recess or groove 10 between the inner circumferential wall 11 thereof and the sealing member 6, a quantity 14 of a soft and nonhardening elastic material. — such as a synthetic plastic—having no adhesive properties and being nonreactive with respect both to the material of the sealing member 6 and the material which is conveyed in the connected tubular members 1, 2 and which may penetrate into the joint. This material 14 will in response to the aforementioned axially directed force applied to the member 2 to fill the unavoidable gap existing between the wall 11 and the sealing member 6 and act as an elastic plug against drops of liquid which could infiltrate along the junction line 17 between the tubular members 1 and 2.

Now, synthetic resin material 22 is introduced into the clearance, with the sealing member 7 being introduced before or after the resin material 22 which is introduced in liquid state but is hardenable. When now the blocking ring number 8 is further introduced to assume the position illustrated in FIG. 2, some of the resin 22 will enter into the recess provided in the blocking ring member 8 at the outer side thereof, as also illustrated in FIG. 2. The blocking ring member 8 is connected in suitable manner with the circumferential wall of the cup-shaped socket 3, for instance by screw threading it thereto or, as shown in FIG. 2, by means of a welded seam 8a. Thereupon, the final remaining clearance is filled with additional synthetic resin material 23 which is allowed to harden, as is the resin material 22. The result is a monolithic joint. It will be noted, however, that the space X is left free from resin material. The purpose of this space is to collect possible air or gas bubbles which might develop during reaction of the resin material and which enter the space X while resin is still liquid. Without the space X, such bubbles would be retained in the resin material and weaken the electrical insulation value of the same.

The joint according to the present invention is provided with two discrete coatings 15 and 16 of electrically insulating material on the inner surfaces of the respective tubular members 1 and 2. Such material may be a synthetic resin material applied in suitable manner, but whatever the material, the coatings 15 and 16 will be strictly independent of one another and will not be connected along the junction line 17 between the two tubular members 1 and 2. Thus, there is a discontinuity along the junction line 17 between the coatings 15 and 16, and if under the influence of sufficiently strong stresses there occurs any relative movement of the various components, cracking of the coatings 15, 16 is avoided because they have freedom of movement along with their respectively associated tubular members 1 and 2, as a result of their discontinuity along the junction line 17.

Of course, the contents —such as liquid—passing through the conduits 1 and 2 can penetrate into the joint along the junction line 17. However, in accordance with the present invention this is of no adverse consequence because of the firm fluidtight seal which is established between the overlapping marginal portions of the members 5 and 6 and beyond which the moisture cannot penetrate. Thus, assuming that the material 14 were to be omitted—which is entirely within the realm of the present invention—the moisture would be capable of contacting the metallic material of the member 1 at the bottom wall 3a of the cup-shaped socket 3, but could not contact any metallic portion of the tubular member 2 and instead could contact only the electrically insulating material of the member 5. However, if the material 14 is provided, then the moisture cannot even contact the metallic material of the tubular member 1 because the space between the member 6 and the wall 11 will be filled by such material 14.

In accordance with a further concept of the present invention, and particularly if the joint is intended for connecting tubular members 1 and 2 which carry conductive fluids, each of the tubular members 1 and 2 is provided with at least one plate or anode 18, 19 which are provided on the respective inner surfaces of the tubular members 1 and 2 in suitable conductive matter, by brazing or the like. They are located at a predetermined distance from the axially outermost ends 20, 21 of the coatings 15, 16, and this distance usually corresponds substantially to the diameter of the tubular members 1 and 2. However, the distance may also be greater or lesser. Such anodes consist of a nonreactive insoluble metallic material, such as platinum-clad titanium, and they constitute a preferable or in effect practically the only outlet for possible electric currents through the fluid conveyed in the tubular members 1 and 2 and across the juncture line 17 between them and the anodic and cathodic areas which can be created between the ends of the joint. This avoids the corrosion phenomena which would otherwise be observed at the outer anodic zones of the ends of the insulating linings 15 and 16. This, of course, is an important feature because it provides excellent corrosion protection.

I wish it understood that if desired the grooves 9, 10 and the associated sealing members 5, 6 may be omitted at the locations illustrated in FIGS. 1 and 2, and may instead be provided on the surface 4b of the flange 4 and the juxtaposed surface of the blocking ring 8. In that case the sealing member 7 will be omitted. Of course, it is also possible to leave the construction as shown in FIGS. 1 and 2 and in addition to provide grooves similar to the grooves 9 and 10 and associated sealing elements similar to the sealing elements 5 and 6 on the surface 4b and the juxtaposed surface of the blocking ring 8.

Figure 3:
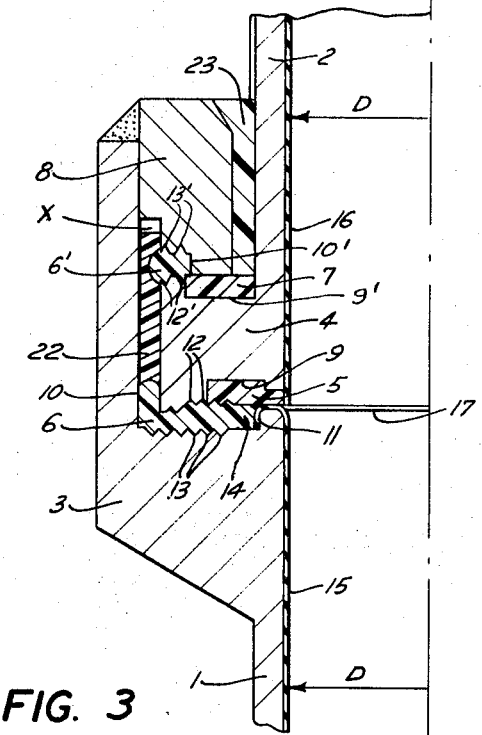
FIG. 3 is a view similar to FIG. 2 but of an other embodiment of the invention.

The embodiment of FIG. 3, finally, resembles that of FIGS. 1 and 2 to a substantial extent. Like elements have therefore been identified with like reference numerals.

Here, however, an additional sealing element 6' of annular configuration and of elastically compressible plastic material is compressed between the members 4 and 8. The former is provided with a recess 9' corresponding to recess 9, and member 8 is provided with a recess 10' corresponding to recess 10. The annular spacer ring 7 is located in recess 9', and the additional sealing element 6' is located in recess 10' with a portion of element 6' projecting radially outwardly beyond the flange 4 and member 8. Grooves, teeth or the like 12' and 13' are respectively provided in the members 4 and 8 and correspond to those identified with reference numerals 12 and 12; they serve the same purpose, of course.

It will be understood that each of the elements described above, or two or more together, may also find a useful application in other types of constructions differing from the types described above.

While the invention has been illustrated and described as embodied in an electrically insulating pipe joint, it is not intended to be limited to the details shown, since various modifications and structural changes may be made without departing in any way from the spirit of the present Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore such adaptations should and are intended to be comprehended within the meaning and range of equivalence of the following claims.

What is claimed as new and desired to be protected by Letters Patent is set forth in the appended

1. An electrically insulating pipe joint, comprising a first tubular member of metallic material having at one end thereof a socket member provided with an open side and transversely extending bottom face opposite said open side; a second tubular member of metallic material having at one end a transverse flange member of predetermined outer diameter received with clearance in said socket member and having an axial face juxtaposed with said bottom face and an axially directed surface facing said open side; a first annular groove in one of said faces concentric with the respective tubular member and having an inner diameter equal to the inner diameter of the same, and an outer diameter smaller than said predetermined outer diameter of said flange member; a circumferentially complete first annular member of rigid electrically insulating material fixedly received in and having an inner diameter at least substantially equal to the inner diameter of said first groove; a second annular groove in the other of said faces concentric with the respective tubular member and having an outer diameter at least equal to said predetermined diameter of said flange member, and an inner diameter larger than the inner diameter of said first groove but smaller than the outer diameter of the same; a circumferentially complete second annular member of elastically yieldable electrically insulating material received in said second groove at least substantially filling the same and having an inner circumferential margin in fluidtightly sealing engagement with a corresponding outer circumferential margin of said first annular member; discrete first and second coatings of electrically insulating material respectively provided on the inner surfaces of the respective tubular members and each extending to the juncture between said tubular members; and means substantially completely filling said clearance and connecting all of said members mechanically against movement and in electrically insulating relationship.

2. A pipe joint as defined in claim 1, wherein said means comprises a blocking ring member received in said socket member rigid with the same and overlying said axially directed surface; a ring member of electrically insulating material confined between and in engagement with said axially directed surface and said blocking ring member; and hardenable electrically insulating material filling interstices existing between respective ones of said members.

3. A pipe joint as defined in claim 1, said second groove having a radially inner circumferential wall portion, and said second annular member having a radially inner circumferential edge face slightly spaced from said radially inner circumferential wall portion; and further comprising a body of pliable nonadhesive material inert with reference to said second annular member and to the contents of said tubular members, accommodated in the space between said wall portion and said edge face and in sealing engagement with said first annular member.

4. A pipe joint as defined in claim 1, said tubular members being adapted for conveying conductive fluids and said coatings having terminal edges axially spaced from the junction between said members; and further comprising at least two corrosion-preventing anodes, each fixed to one of said tubular members at the inner surface thereof and at a location intermediate said junction and the respective terminal edge, and being spaced from the latter by a predetermined distance, said anodes consisting of nonreactive insoluble metallic material.

5. A pipe joint as defined in claim 4, wherein said distance corresponds at least substantially to the diameter of the respective tubular member.

6. A pipe joint as defined in claim 4, wherein said anodes consist of platinum-plated titanium.

7. A pipe joint as defined in claim 2; further comprising an additional first and second groove similar to the first-mentioned grooves provided in said axially directed surface and in the blocking ring member juxtaposed therewith; and additional first and second annular members received in the respective additional grooves and having respective circumferential margins in fluidtightly sealing engagement with one another.

8. A pipe joint as defined in claim 1, said coatings of electrically insulating material being composed of synthetic resin material.

9. A pipe joint as defined in claim 2, wherein said hardenable electrically insulating material is synthetic resin material.

10. An electrically insulating pipe joint, comprising a first tubular member of metallic material having at one end thereof a cup-shaped socket member provided with an open side and a transversely extending annular bottom face; a second tubular member of metallic material having at one end a transverse flange member of predetermined outer diameter received with clearance in said socket member and having an axially directed annular surface facing said open side; a blocking ring member received in said open side and having an annular end surface juxtaposed with said axially directed surface of said flange member; a first annular groove provided in one of said annular surfaces concentric with the respective tubular member and having an outer diameter equal to and an inner diameter smaller than the outer diameter of said one annular surface; a circumferentially complete annular first member of rigid electrically insulating material fixedly received in and having an outer diameter at least substantially equal to said outer diameter of said first groove; a second annular groove in the other of said annular surfaces concentric with the respective tubular member and having an outer diameter smaller than said outer diameter of said first groove; a circumferentially complete second annular member of elastically yieldable electrically insulating material received in said second groove at least substantially filling the same and having an outer circumferential margin in fluidtightly sealing engagement with a corresponding inner circumferential margin of said first annular member; and substantially completely filling said clearance and connecting all of said members mechanically against movement and in electrically insulating relationship.